J. & A. DENSMORE.
Freight Car.
No. 53,794.  Patented Apr. 10, 1866.
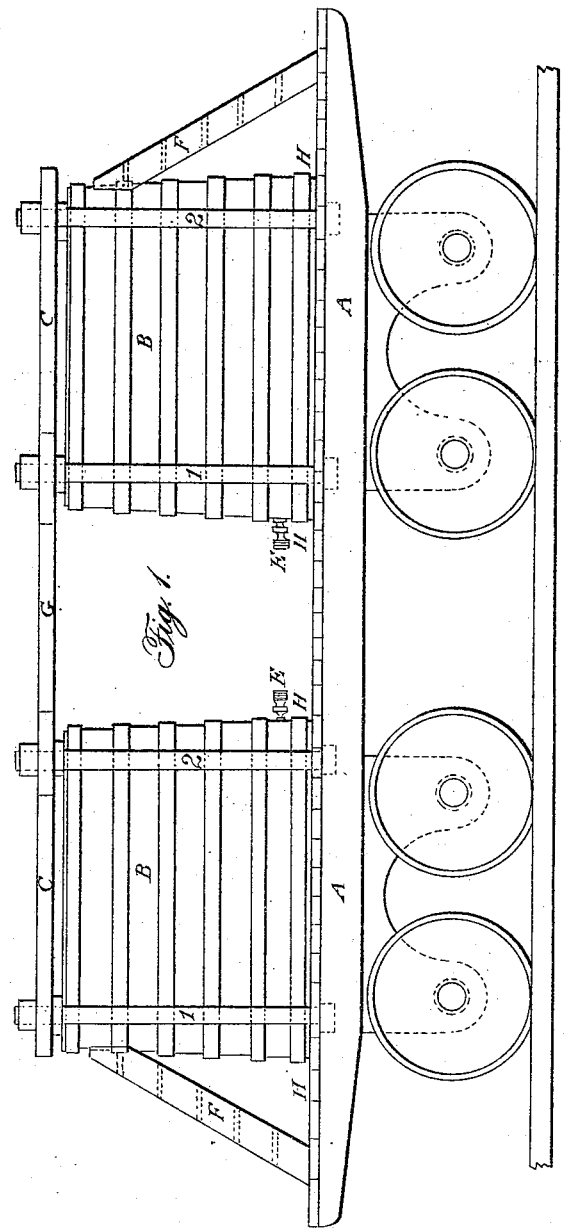
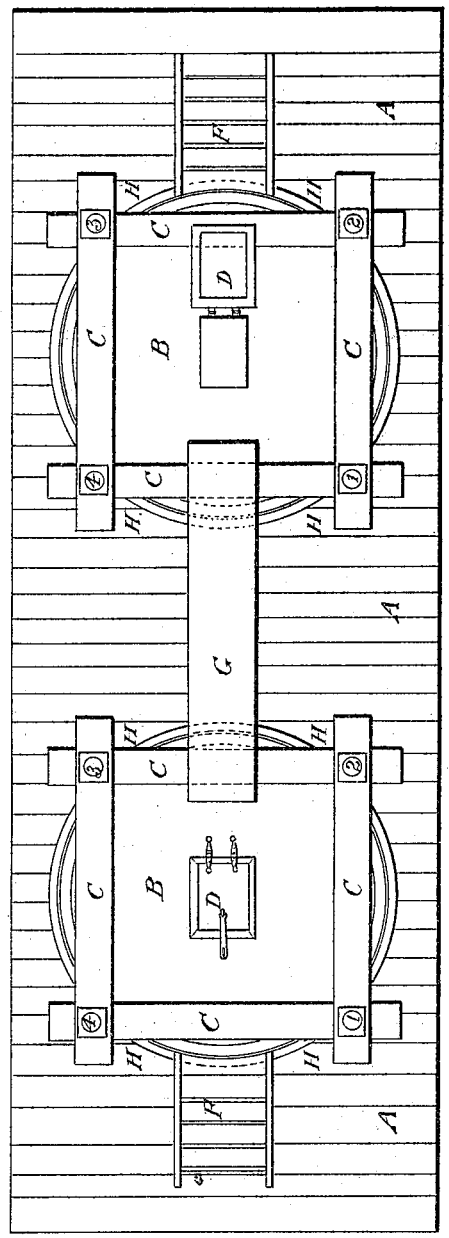
Witnesses:
Jno Jay Knox
M. A. Claney
Inventor:
James Densmore
Amos Densmore

UNITED STATES PATENT OFFICE.

JAMES DENSMORE AND AMOS DENSMORE, OF MEADVILLE, PENNSYLVANIA.

IMPROVED CAR FOR TRANSPORTING PETROLEUM.

Specification forming part of Letters Patent No. 53,794, dated April 10, 1866.

*To all whom it may concern:*

Be it known that we, JAMES DENSMORE and AMOS DENSMORE, of Meadville, Crawford county, Pennsylvania, have invented a new and Improved Mode of Carrying Petroleum and other like Liquid Substances on Railway-Cars; and we do hereby declare that the following is a full and exact description thereof, reference being had to the accompanying drawings, and to the letters and figures of reference marked thereon.

The nature of our invention consists in combining two large light tight tanks, of iron or wood or other material, with the platform of a common railway flat freight-car, making them practically a part of the car, so as to carry the desired substance in bulk instead of in barrels, casks, or other vessels or packages, as is now universally done on railway-cars, and thereby save carrying the weight of the said barrels, casks, or other vessels or packages.

To enable others to make and use our invention, we proceed to describe its construction and operation.

Upon the platform of the car A A we make two large tanks, B B, of light wood staves hooped or of light sheet-iron riveted and calked, and put each tank directly over one of the trucks, so that the strain and weight shall be upon that part of the car the stronger and the better able to bear them. Upon the top of each tank we put a frame-work, C C C C, and through the corners of the said frame-work, close to the outside of the tank, down through the platform of the car, we pass the bolts 1 2 3 4 and fasten and press the tank to the car with screws upon these bolts, the frame-work on the top of the tank, screwed down upon the tank by the bolts outside and close to it, acting as a brace, also to prevent any shock or jar to the tank from the swaying of the car while in motion. In the top head of each tank we make a man-hole, through which to pour the substance to be carried, and to get into the tank for any desired purpose, and around each man-hole we put a casing, and over the casing and man-hole we put a cover, D, to prevent rain, snow, dirt, or anything from falling or leaking into the tank. At the bottom of each tank we put in a faucet, E, whereby to draw off the contents of the tank, and up the side of each tank we put the steps F, and across from one tank to the other we put the runway G, to enable the brakeman or other person to pass from one end to the other of the car with facility.

What we claim as our invention, and desire to secure by Letters Patent, is—

1. The two tanks B B, attached to the platform of a car, A A, by means of the frame-works C C C C and C C C C, together with the bolts 1 2 3 4 and 1 2 3 4 directly over the trucks, when the same are constructed in the combination as hereinbefore described, and for the purposes set forth hereinbefore, or any other mechanical construction substantially the same and which will produce the same results.

2. We do not claim any one particular item as new; but we do claim the combination and application as entirely new and as a valuable and useful improvement.

JAMES DENSMORE.
AMOS DENSMORE.

Witnesses:
WILLIAM DENSMORE,
C. M. BOUSH.